(12) United States Patent
Masuda (10) Patent No.: US 10,861,364 B2
(45) Date of Patent: Dec. 8, 2020

(54) PROJECTOR AND PROJECTION METHOD

(71) Applicant: CASIO COMPUTER CO., LTD, Tokyo (JP)

(72) Inventor: Hiroki Masuda, Akishima (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 0 days.

(21) Appl. No.: 16/118,920

(22) Filed: Aug. 31, 2018

(65) Prior Publication Data
US 2019/0096303 A1    Mar. 28, 2019

(30) Foreign Application Priority Data
Sep. 27, 2017    (JP) ................ 2017-186855

(51) Int. Cl.
*G09G 3/00*     (2006.01)
*H04N 9/31*     (2006.01)
(Continued)

(52) U.S. Cl.
CPC .......... *G09G 3/007* (2013.01); *H04N 9/3158* (2013.01); *H04N 9/3161* (2013.01);
(Continued)

(58) Field of Classification Search
CPC ............ G09G 3/007; G09G 2310/08; G09G 2320/0238; G03B 21/16; G03B 21/2013; G03B 21/204
(Continued)

(56) References Cited

U.S. PATENT DOCUMENTS

2014/0176916 A1*   6/2014   Masuda ............... H04N 9/31
                                                  353/38
2017/0363942 A1*   12/2017   Hiramatsu ......... G03B 21/2033
2018/0033357 A1*   2/2018   Li ......................... H04N 9/31

FOREIGN PATENT DOCUMENTS

CN        103888702 A     6/2014
CN        105988266 A    10/2016
(Continued)

OTHER PUBLICATIONS

EPO; Application No. 18191109.0; Partial European Search Report dated Feb. 21, 2019.
(Continued)

*Primary Examiner* — Mark Edwards
(74) *Attorney, Agent, or Firm* — Fitch, Even, Tabin & Flannery LLP (57) ABSTRACT

A projector includes a light source unit having a first light source emitting first wavelength range light and a luminescent wheel having a first wavelength range light transmission area and a luminescent material area receiving the first wavelength range light and reflecting second different wavelength range light provided circumferentially end to end, a light source control unit controlling the light source unit, a display device receiving light from the light source unit to form image light, a pixel shifting unit shifting a display position of the image light for each of a plurality of sub-frame periods forming one image frame period, and a control unit controlling the light source control unit and the pixel shifting unit, the control unit synchronizing a timing the pixel shifting unit shifts the display position for each sub-frame period with a timing the emitted light from the light source unit is switched over.

7 Claims, 7 Drawing Sheets

(51) Int. Cl.
*G03B 21/20* (2006.01)
*G03B 21/16* (2006.01)
(52) U.S. Cl.
CPC ......... *H04N 9/3164* (2013.01); *H04N 9/3188* (2013.01); *G03B 21/16* (2013.01); *G03B 21/204* (2013.01); *G03B 21/2013* (2013.01); *G09G 2310/08* (2013.01); *G09G 2320/0238* (2013.01)
(58) Field of Classification Search
USPC ....................................................... 345/691
See application file for complete search history.

(56) References Cited

FOREIGN PATENT DOCUMENTS

| | | | | |
|---|---:|---|---|---|
| JP | 11298829 | A | * | 10/1999 |
| JP | 2007-163943 | A | | 6/2007 |
| JP | 2007163943 | A | * | 6/2007 |
| JP | 2011-44367 | A | | 3/2011 |
| JP | 2016-110018 | A | | 6/2016 |
| JP | 2016110018 | A | * | 6/2016 |
| JP | 2017-167287 | A | | 9/2017 |
| WO | 2016124094 | A1 | | 8/2016 |

OTHER PUBLICATIONS

JPO; Application No. 2017-186855; Notice of Reasons for Refusal dated Nov. 28, 2019.
CNIPA; Application No. 201811133025.3; First Office Action dated Aug. 3, 2020.

* cited by examiner

| FIRST STATE | SECOND STATE | THIRD STATE | FOURTH STATE |
|---|---|---|---|
|  |  |  |  |

PROJECTOR AND PROJECTION METHOD

CROSS-REFERENCE TO RELATED APPLICATION

This application is based upon and claims the benefit of priority under 35 USC 119 from Japanese Patent Application No. 2017-186855 filed on Sep. 27, 2017, the entire disclosure of which, including the description, claims, drawings and abstract, is incorporated herein by reference.

BACKGROUND OF THE INVENTION

Field of the Invention

The present invention relates to a projector and a projection method.

Description of the Related Art

Data projectors are widely used on many occasions in these days as an image projection system for projecting what is displayed on a screen of a personal computer and a video image, and further an image based on image data recorded on a memory card onto a screen. In these data projectors, light emitted from a light source is collected on to a micromirror display device called a digital micromirror device (DMD) or a liquid crystal panel to display a colored image on a screen.

In these image projection systems or projectors, a high-quality projected image is required to be displayed on a screen because a colored image is displayed on the screen. Then, various efforts have been made to realize the projection of such a high-quality image on the screen. For example, as one of such efforts, there is known a so-called pixel shifting technology for realizing a high resolution. Here, in relation to the image shifting, a related technology is disclosed in Japanese unexamined Patent Publication No. 2016-110018 (JP-A-2016-110018).

Specifically, an image projector described in JP-A-2016-110018 includes an image display unit having a DMD configured to form an image, an illumination optical system unit configured to guide light to the image display unit, a projection optical system unit configured to enlarge and project an image formed, and a shift control unit configured to displace the DMD periodically between a first state and a second state.

In the technology disclosed in JP-A-2016-110018, the DMD is moved directly to execute the pixel shifting. Due to this, as JP-A-2016-110018 describes, when the pixel shifting unit displaces the DMD to the first state and the second state, a predetermined displacement period is generated until the display of the DMD is stabilized. In other words, when the technology disclosed in JP-A-2016-110018 is used to execute the pixel shifting, a predetermined transition period is required until projected light is stabilized.

In addition, in emitted light emitted from a light source unit, a nullified period is generated when color segments are switched over. Additionally, a color mixing period may be generated which cannot be used for monochromatic light. The display of a pixel is not stabilized during the transition time resulting from the pixel shifting and the nullified period or the color mixing period generated when the color segments are switched over, and therefore, a deteriorated quality and/or a weakened contrast of an image is concerned about.

SUMMARY OF THE INVENTION

The invention has been made in view of these situations, and an object of the invention is to provide a projector and a projection method that can stabilize projected light early and improve the quality and contrast of an image, even when pixel shifting is executed which requires a predetermined transition time.

According to an aspect of the invention, there is provided a projector including a light source unit having a first light source configured to emit light of a first wavelength range and a luminescent wheel on which a transmission area configured to transmit the light of the first wavelength range and a luminescent material area on to which the light of the first wavelength range is shone and which is configured to reflect light of a second wavelength range that differs from the light of the first wavelength range are provided end to end in a circumferential direction, a light source control unit configured to control the light source unit, a display device on to which emitted light from the light source unit is shone to form image light, a pixel shifting unit configured to shift a display position of the image light for each sub-frame period of a plurality of sub-frame periods making up one image frame period, and a control unit configured to control the light source control unit and the pixel shifting unit, wherein the control unit synchronizes a timing at which the pixel shifting unit shifts the display position for each of the plurality of sub-frame periods with a timing at which the emitted light from the light source unit is switched over.

According to another aspect of the invention, there is provided a projection method for a projector including a light source unit having a first light source configured to emit light of a first wavelength range and a luminescent wheel on which a transmission area configured to transmit the light of the first wavelength range and a luminescent material area on to which the light of the first wavelength range is shone and which is configured to reflect light of a second wavelength range that differs from the light of the first wavelength range are provided end to end in a circumferential direction, a light source control unit configured to control the light source unit, a display device on to which emitted light from the light source unit is shone to form image light, a pixel shifting unit configured to shift a display position of the image light for each sub-frame period of a plurality of sub-frame periods making up one image frame period, and a control unit configured to control the light source control unit and the pixel shifting unit, the projection method including synchronizing a timing at which the pixel shifting unit shifts the display position for each of the plurality of sub-frame periods with a timing at which the emitted light from the light source unit is switched over by the control unit.

BRIEF DESCRIPTION OF THE PREFERRED SEVERAL VIEWS OF THE DRAWINGS

DETAILED DESCRIPTION OF THE PREFERRED EMBODIMENT (First Embodiment)

Figure 1:
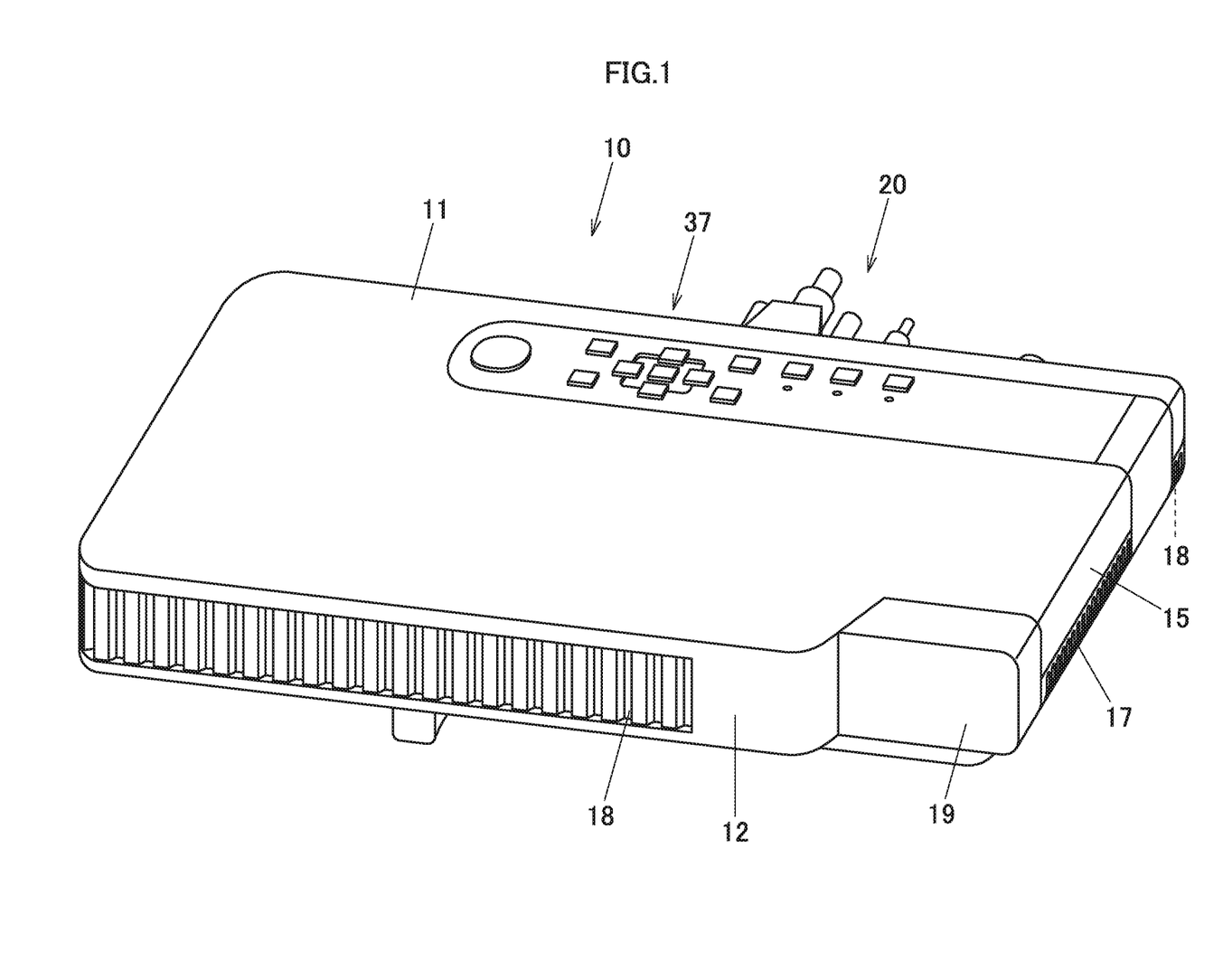
FIG. 1 is an external perspective view of a projector according to an embodiment of the invention.

Hereinafter, a mode for carrying out the invention will be described. FIG. 1 is an external perspective view of a projector 10. In description of this embodiment, when left and right are referred to in relation to the projector 10, they denote, respectively, left and right directions with respect to a projecting direction of the projector 10. When front and rear are referred to in relation to the projector 10, they denote, respectively, front and rear directions with respect to the direction of a screen and a traveling direction of a pencil of light from the projector 10.

As FIG. 1 illustrates, the projector 10 has a substantially rectangular parallelepiped shape. The projector 10 has a lens cover configured to cover a projection port to a side of a front panel 12 which is a front side panel of a casing of the projector 10, and a plurality of inside air outlet holes 18 are provided in the front panel 12. Further, the projector 10 includes an Ir reception unit configured to receive a control signal from a remote controller, not illustrated.

A keys/indicators unit 37 is provided on an upper panel 11 of the casing of the projector 10. Disposed on this keys/indicators unit 37 are keys and indicators including a power supply switch key, a power indicator, a projection switch key, and an overheat indicator. The power indicator informs whether a power supply is on or off. The projection switch key switches on or off the projection by the projector 10. The overheat indicator informs of an overheat condition occurring in a light source unit, a display device, and a control unit when they really overheat.

Various types of (a group of) terminals 20 including a USB terminal, a video signal input D-SUB terminal into which analog RGB video signals are inputted, an S terminal, an RCA terminal and a sound/voice output terminal which are provided in an input and output connector unit and a power supply adaptor plug are provided on a back panel of the casing. Additionally, outside air inlet holes are formed in the back panel. Further, a plurality of inside air outlet holes 17 are formed in each of a right panel, which is a side panel of the casing, not illustrated, a left panel 15, which is a side panel illustrated in FIG. 1, and the front panel 12. Outside air inlet holes 18 are also formed in a corner portion of the left panel 15 which lies near the back panel and the back panel 13.

Figure 2:
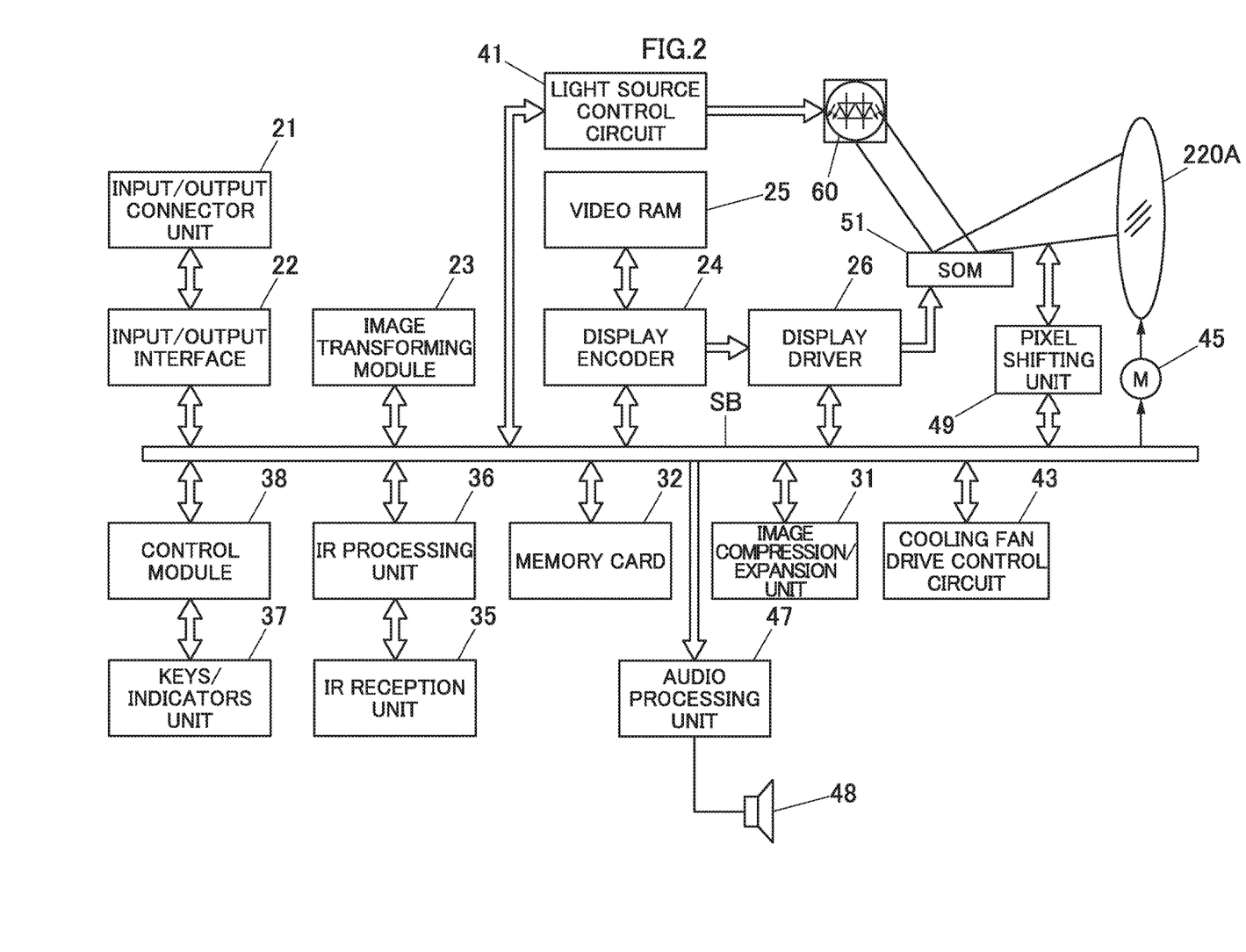
FIG. 2 is a functional block diagram of the projector according to the embodiment of the invention.

Next, a projector control unit of the projector 10 will be described by the use of a functional block diagram illustrated in FIG. 2. The projector control unit includes a control module 38, an input/output interface 22, an image transforming module 23, a display encoder 24, a display driver 26, a light source control circuit 41 and a pixel shifting unit 49.

The control module 38 governs the control of respective operations of circuitries within the projector 10 and is made up of a CPU, a ROM that stores operation programs of various types of settings in a fixed fashion, and a RAM that is used as a working memory.

Then, image signals of various standards that are inputted from the input/output connector unit 21 are sent via the input/output interface 22 and a system bus (SB) to the image transforming module 23 where the image signals are transformed so as to be unified into an image signal of a predetermined format that is suitable for display by the projector control unit. Thereafter, the unified image signal is outputted to the display encoder 24.

The display encoder 24 deploys the inputted image signal on a video RAM 25 for storage therein and generates a video signal from the contents stored in the video RAM 25, outputting the video signal so generated to the display driver 26.

The display driver 26 functions as a display device control unit. The display driver 26 drives a display device 51, which is a spatial optical modulator (SOM), at an appropriate frame rate that corresponds to the image signal outputted from the display encoder 24. The display driver 26 shines a pencil of light emitted from a light source unit 60 on to a display device 51 that employs a digital micromirror device (DMD) by way of a light source side optical system, which will be described later, to thereby form image light L2 (refer to FIG. 3) by using reflection light reflected from the display device 51, and projects projected light L4 (refer to FIG. 3) on to a screen, not illustrated, by way of a fixed lens barrel 220A for display on the screen.

A movable lens group 235 (refer to FIG. 3) of the fixed lens barrel 220A is driven by a lens motor 45 for zooming or focusing. A fixed lens group 220 included in a projection lens unit (a projection-side optical system) 220 illustrated in FIG. 3, which will be described later, and the movable lens group 235 will be referred to as the fixed lens barrel 220A in general.

The pixel shifting unit 49 generates pixel shifted image light L3 (refer to FIG. 3) on the basis of the image light L2 (refer to FIG. 3) emitted from the display device 51.

An image compression/expansion unit 31 performs a recording process in which a luminance signal and a color difference signal of an image signal are data compressed through ADCT and Huffman coding processes, and the compressed data is sequentially written on a memory card 32 that constitutes a detachable recording medium.

With the projector 10 set in a reproducing mode, the image compression/expansion unit 31 reads out the image data recorded on the memory card 32 and expands the individual image data that make up a series of dynamic images frame by frame. Then, the image compression/expansion unit 31 outputs the image data to the display encoder 24 by way of the image transforming module 23 so as to enable the display of dynamic images based on the image data stored on the memory card 32.

Operation signals generated at the keys/indicators unit 37 that includes the main keys and indicators that are provided on the upper panel 11 of the casing are sent out directly to the control module 38. Key operation signals from the remote controller are received by the IR reception unit 35 and are then demodulated into a code signal at an IR processing unit 36 for output to the control module 38.

An audio processing unit 47 is connected to the control module 38 by way of the system bus (SB). This audio processing module 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The control module 38 controls the light source control circuit 41 and the pixel shifting unit 49. The light source control circuit 41 is controlled by the control module 30 to control separately the operation of an excitation light shining device and a red light source device of the light source unit 60 so that light of a predetermined wavelength range that is required in generating image light L2 (refer to FIG. 3) in the display device 51 is emitted from the light source unit 60, whereby light of red, green and blue wavelength ranges is generated and emitted. Then, the control module 38 controls the pixel shifting unit 49 in such a way as to be synchronized with a predetermined spoke period (a turning off period).

Additionally, the control module 38 causes a cooling fan drive control circuit 43 to detect temperatures through a plurality of temperature sensors which are provided in the light source unit 60 so as to control the revolution speeds of cooling fans on the basis of the results of the temperature detections. The control module 38 can also control the cooling fan drive control circuit 43 to keep the cooling fans rotating by use of a timer even after the power supply to a main body of the projector 10 is switched off. Alternatively, the control module 38 can determine on a timing at which the power supply to the main body of the projector 10 is cut off depending upon the results of the temperature detections by the temperature sensors.

Figure 3:
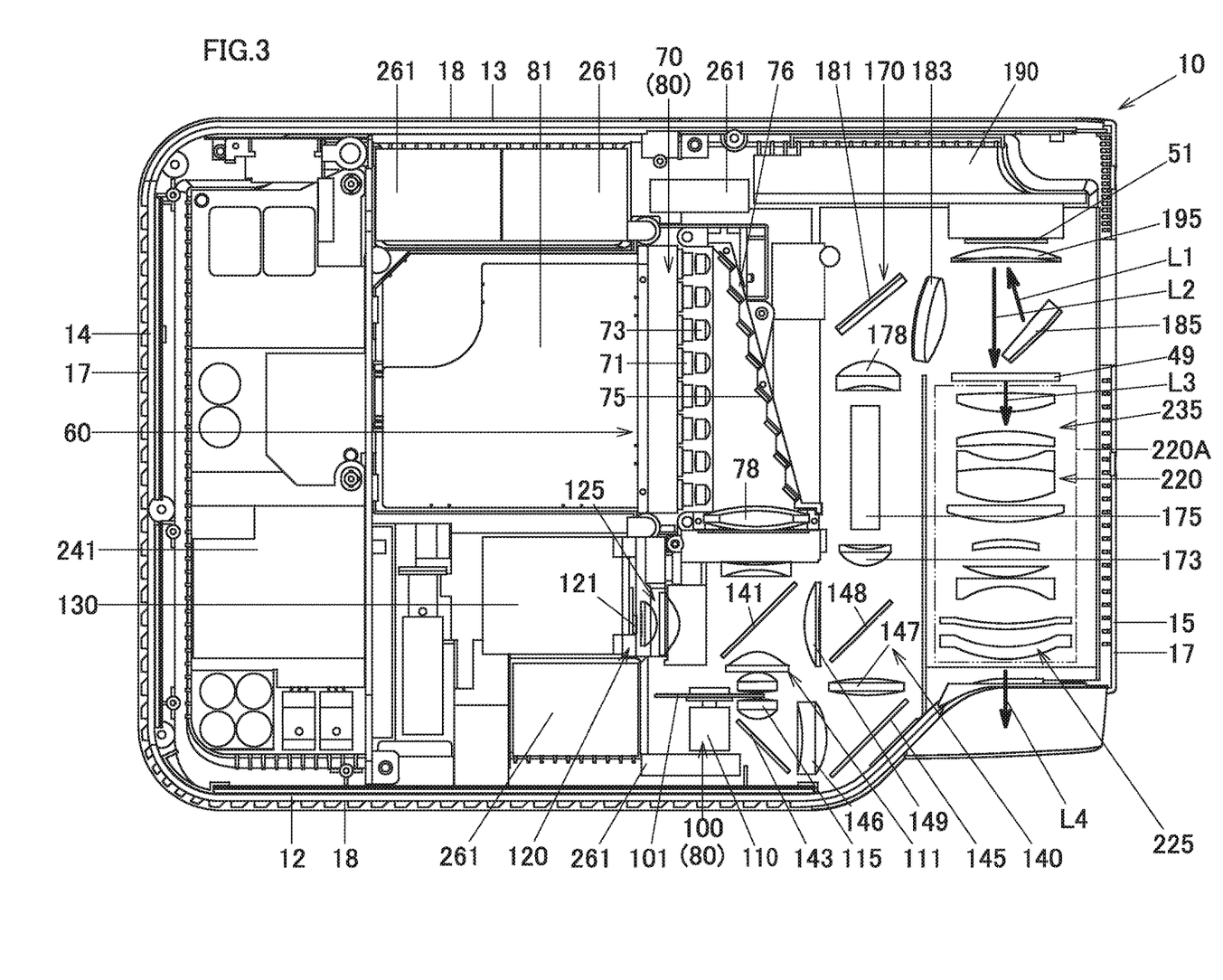
FIG. 3 is a schematic plan view illustrating an internal construction of the projector according to the embodiment of the invention.

Next, an internal construction of the projector 10 will be described by reference to FIG. 3. FIG. 3 is a schematic plan view illustrating an internal construction of the projector 10. The projector 10 includes a control circuit board 241 near the right panel 14. This control circuit board 241 includes a power supply circuit block and a light source control block. The projector 10 includes the light source unit 60 to a side of the control circuit board 241, that is, at a substantially central portion of the casing of the projector 10. A light source-side optical system 170 and the fixed lens barrel 220A are disposed between the light source unit 60 and the left panel 15 in the projector 10.

The light source unit 60 includes an excitation light shining device 70 that is not only a light source of light of a blue wavelength band or range but also an excitation light source, a red light source device 120 that is a light source of light of a red wavelength band or range, and a green light source device 80 that is a light source of light of a green wavelength band or range. The green light source device 80 is made up of the excitation light shining device 70 and a luminescent plate device 100. A light guiding optical system 140 is disposed in the light source unit 60. The light guiding optical system 140 guides light of the blue wavelength range, light of the green wavelength range and light of the red wavelength range. The light guiding optical system 140 collects light of the blue wavelength range, light of the green wavelength range and light of the red wavelength range that are emitted from the individual light source devices 70, 80, 120, respectively to an incident port of a light tunnel 175.

The excitation light shining device 70 is disposed at a substantially central portion in a left-and-right direction of the casing of the projector 10 and near the back panel 13. The excitation light shining device 70 includes a group of light sources made up of a plurality of blue laser diodes 71, a group of reflection mirrors 75, a collective lens 178 and a heat sink 81. The group of light sources is made up of the plurality of blue laser diodes 71 that are semiconductor light emitting devices that are disposed so that optical axes of the blue laser diodes 71 are parallel to the back panel 13. The group of reflection mirrors 75 turns an axis of light of the blue wavelength range (light of a first wavelength range) that is emitted light from each of the blue laser diodes 71 through 90 degrees towards the direction of the front panel 12. The collective lens 78 collects emitted light from each of the blue laser diodes 71 that is reflected on the group of reflection mirrors 75. The heat sink 81 is disposed between the blue laser diodes 71 and the right panel 14.

The group of light sources is formed by arranging the plurality of blue laser diodes 71, which are the semiconductor light emitting devices, into a matrix configuration. Collimator lenses 73 are disposed individually on optical axes of the blue laser diodes 71, and the collimator lenses 73 enhance the directivity of light emitted from each of the blue laser diodes 71 and transform the light into parallel light. The group of reflection mirrors 75 is formed by arranging a plurality of reflection mirrors into a step-like configuration and integrating the arranged reflection mirrors 75 with a mirror substrate 76 while being adjusted in relation to their positions. The group of reflection mirrors 75 contracts sectional areas of pencils of light emitted from the blue laser diodes 71 in one direction for output to the collective lens 78.

A cooling fan 261 is disposed between the heat sink 81 and the back panel 13, and the blue laser diodes 71 are cooled by the cooling fan 261 and the heat sink 81. Further, a cooling fan 261 is also disposed between the group of reflection mirrors 75 and the back panel 13, and the group of reflection mirrors 75 and the collective lens 78 are cooled by the cooling fan 261.

The red light source device 120 includes a red light source 121 that is disposed so that an optical axis of the red light source 121 becomes parallel to the blue laser diodes 71 and a group of collective lenses 125 that collects light emitted from the red light source 121. This red light source 121 is a red light emitting diode that is a semiconductor light emitting device emitting light of the red wavelength range. The red light source device 120 is disposed so that an axis of light of the red wavelength range emitted from the red light source device 120 intersects an axis of light of the blue wavelength range emitted from the excitation light shining device 70 and an axis of light of the green wavelength range emitted from a luminescent plate 101. The red light source device 120 includes a heat sink 130 disposed on a side of the red light source 121 that is directed towards the right panel 14. A cooling fan 261 is disposed between the heat sink 130 and the front panel 12, and the red light source 121 is cooled by the cooling fan 261 and the heat sink 130.

The luminescent plate device 100 that makes up the green light source device 80 is disposed on an optical path of excitation light emitted from the excitation light shining device 70 and near the front panel 12. The luminescent plate device 100 includes the luminescent plate 101, a motor 110, a group of collective lenses 111 and a collective lens 115. The luminescent plate 101 is a luminescent wheel that is disposed so as to be parallel to the front panel 12, that is, to intersect an axis of light emitted from the excitation light shining device 70 at right angles. The motor 110 drives to rotate the luminescent plate 101. The group of collective lenses 111 collects a pencil of excitation light emitted from the excitation light shining device 70 on to the luminescent plate 101 and collects a pencil of light emitted from the luminescent plate 101 in the direction of the back panel 13. The collective lens 115 collects a pencil of light emitted from the luminescent plate 101 in the direction of the front panel 12. A cooling fan 261 is disposed between the motor 110 and the front panel 12, and the luminescent plate device 100 is cooled by the cooling fan 261.

Figure 4:
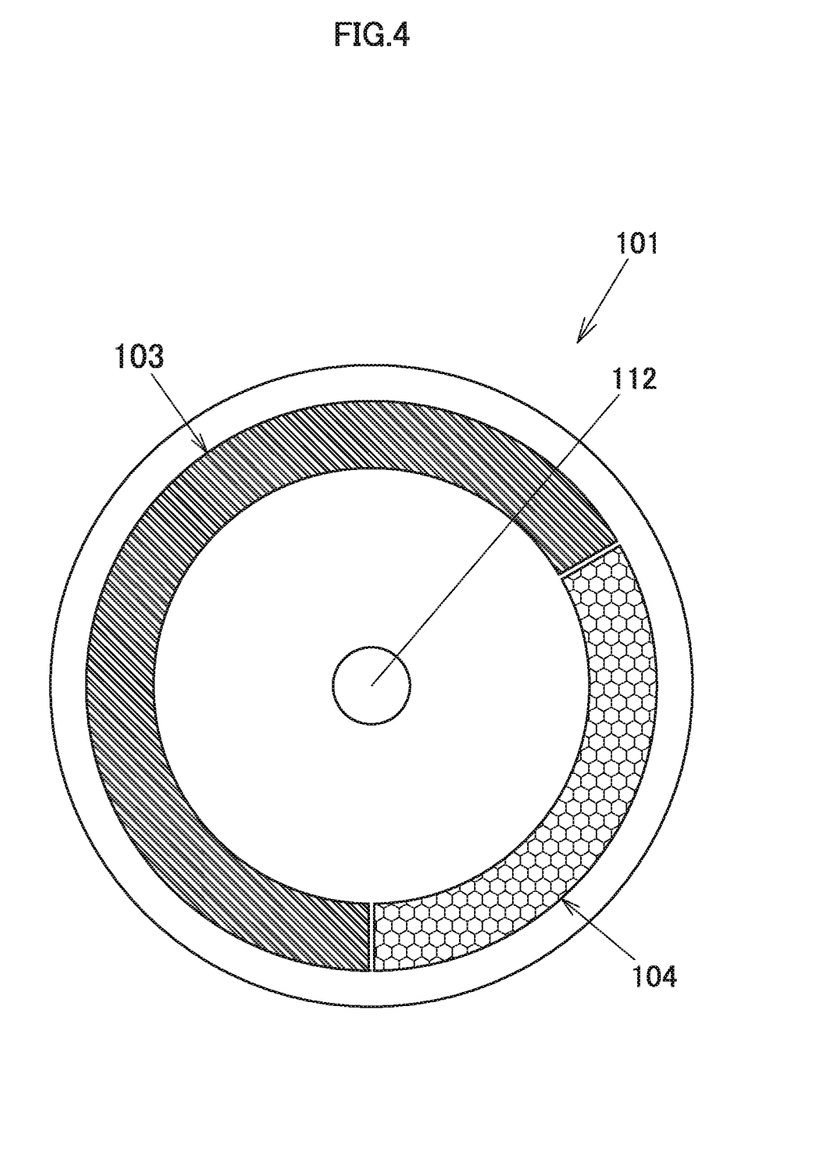
FIG. 4 is a schematic front view of a luminescent wheel according to the embodiment of the invention.

Here, the luminescent plate 101 will be described. FIG. 4 is a schematic front view of the luminescent plate 101. FIG. 4 illustrates a view resulting when the luminescent plate 101 is seen from the side of the group of collective lenses 111. The luminescent plate 101 has a circular disc shape and is driven to rotate about a motor shaft 112 by the motor 110. A luminous light emitting area 103 and a diffuse transmission area 104 are provided end to end in a circumferential direction on the luminescent plate 101. The luminous light emitting area 103 and the diffuse transmission area 104 are formed to have a substantially constant width in a radial direction. The luminous light emitting area 103 receives light of the blue wavelength range (light of the first wavelength range) emitted from the blue laser diodes 71 as excitation light to emit excited luminous light of the green wavelength range (light of a second wavelength range). The diffuse transmission area 104 transmits light emitted from the blue laser diodes 71 while diffusing it. The diffuse light transmitted through the diffuse transmission area 104 is emitted as light of the blue wavelength range of the light source unit 60. A slight gap is provided between the luminous light emitting area 103 and the diffuse transmission area 104, and this gap forms a spoke period (a turning off period) during which no light source light is emitted.

A base material of the luminescent plate 101 is a metallic base material made up of copper or aluminum. An annular groove is formed on a surface of the base material that faces the excitation light shining device 70. A bottom portion of this groove is mirror finished through silver deposition, and a green luminescent material layer is laid out on the mirror finished surface. In the diffuse transmission area that transmits or transmits while diffusing excitation light, for a light transmitting area, a transparent base material having a light transmitting property is fitted in a through hole portion cut out in the base material. For an area that transmits excitation light while diffusing it, a transparent base material on a surface of which minute irregularities are formed through sandblasting is fitted in the through hole portion.

When light of the blue wavelength range as excitation light from the excitation light shining device 70 is shone on to the green luminescent material layer of the luminescent plate 101, a green luminescent material in the luminescent material layer is excited to emit light of the green wavelength range in every direction. A pencil of luminous light of the green wavelength range which is emitted in a luminescent fashion is emitted towards the back panel 13 to be incident on the group of collective lens 111. On the other hand, light of the blue wavelength range emitted from the excitation light shining device 70 and then being incident on the diffuse transmission area that transmits or transmits while diffusing light incident on the luminescent plate 101 is allowed to pass through the luminescent plate 101 or pass through the luminescent plate 101 while being diffused and is then incident on the collective lens 115 disposed on a back side (in other words, a side facing the front panel 12) of the luminescent plate 101.

The light guiding optical system 140 is made up of collective lenses configured to collect pencils of light of the red, green and blue wavelength ranges, reflection mirrors configured to turn axes of the pencils of light of the red, green and blue wavelength ranges into the same axis, and dichroic mirrors. Specifically, the light guiding optical system has a first dichroic mirror 141 that is disposed in a position where light of the blue wavelength range emitted from the excitation light shining device 70 and light of the green wavelength range emitted from the luminescent plate 101 intersect light of the red wavelength range emitted from the red light source device 120. The first dichroic mirror 141 transmits light of the blue wavelength range and light of the red wavelength range and reflects light of the green wavelength range in such a way as to turn an axis of the light of the green wavelength range through 90 degrees in the direction of the left panel 15. Namely, the first dichroic mirror 141 is disposed at an angle of about 45° with respect to light of the red, green and blue wavelength ranges.

A first reflection mirror 143 is disposed on an axis or optical path of light of the blue wavelength range that passes through or passes through while being diffused the luminescent plate 101, that is, between the collective lens 115 and the front panel 12. This first reflection mirror 143 reflects light of the blue wavelength range and turns an axis of this blue light through 90 degrees in the direction of the left panel 15. A collective lens 146 is disposed on a side of the first reflection mirror 143 that is directed towards the left panel 15, and further, a second reflection mirror 145 is disposed on a side of the collective lens 146 that is directed towards the left panel 15. A collective lens 147 is disposed on a side of the second reflection mirror 145 that is directed towards the back panel 13. The second reflection mirror 145 turns an axis of light of the blue wavelength range that is incident thereon by way of the collective lens 146 after having been reflected by the first reflection mirror 143 through 90 degrees towards the back panel 13.

A collective lens 149 is disposed on a side of the first dichroic mirror 141 that is directed towards the left panel 15. Further, a second dichroic mirror 148 is disposed on a side of the collective lens 149 that is directed towards the left panel 15 and on a side of the collective lens 147 that is directed towards the back panel 13. The second dichroic mirror 148 reflects light of the red wavelength range and light of the green wavelength range so as to turn axes of the red light and the green light through 90 degrees towards the back panel 13 and transmits light of the blue wavelength range.

An axis of light of the red wavelength range that passes through the first dichroic mirror 141 and light of the green wavelength range that is reflected by the first dichroic mirror 141 so as to coincide with the axis of the light of the red wavelength range are incident on the collective lens 149. Then, the light of the red wavelength range and the light of the green wavelength range that pass through the collective lens 149 are reflected by the second dichroic mirror 148 and are then collected to the incident port of the light tunnel 175 by way of a collective lens 173 of the light source-side optical system 170. On the other hand, the light of the blue wavelength range that passes through the collective lens 147 then passes through the second dichroic mirror 148 to be collected to the incident port of the light tunnel 175 by way of the collective lens 173.

The light source-side optical system 170 includes the collective lens 173, the light tunnel 175, a collective lens 178, a light axis turning mirror 181, a collective lens 183, a shining mirror 185, and a condenser lens 195. The condenser lens 195 emits image light that is emitted from the display device 51 that is disposed on a side of the condenser lens 195 that is directed towards the back panel 13 towards the fixed lens barrel 220A, and therefore, the condenser lens 195 is understood to constitute part of a projection lens unit 220.

The collective lens 173 configured to collect light source light to the incident port of the light tunnel 175 is disposed near the light tunnel 175. Thus, light of the red wavelength range, light of the green wavelength range and light of the blue wavelength range are collected to be incident on the light tunnel 175 by the collective lens 173. The pencil of light that is incident on the light tunnel 175 is made into a pencil of light is transformed into a pencil of light whose luminous intensity is distributed uniformly by the light tunnel 175.

The light axis turning mirror 181 is disposed on an optical axis of the light guiding device 175 on a side of the light tunnel 175 that is directed towards the back panel 13 via the collective lens 178. A pencil of light emerging from an emerging port of the light tunnel 175 is collected by the collective lens 178, whereafter an axis of the pencil of light is turned to be directed towards the left panel 15 by the light axis turning mirror 181.

The pencil of light that is reflected by the light axis turning mirror 181 is collected by the collective lens 183 and is then shone on to the display device 51 at a predetermined angle by way of the condenser lens 195 by the shining mirror 185. A heat sink 190 is provided on a side of the display device 51, which is the DMD, facing the back panel 13. The display device 51 is cooled by this heat sink 190.

The pencil of light, which is light source light L1, shone on to an image forming plane of the display device 51 by the light source-side optical system 170 is reflected on the image forming plane of the display device 51 as image light L2. The pixel shifting unit 49 is disposed on an optical path of image light L2 emitted from the display device 51. Specifically, the pixel shifting unit 49 is disposed between the condenser lens 195 and the fixed lens barrel 220A.

The projection lens unit 220 is made up of the condenser lens 195, the movable lens group 235 and the fixed lens group 225. The movable lens group 235 is formed to be moved by the lens motor. Then, the movable lens group 235 and the fixed lens group 225 are incorporated in the fixed lens barrel 220A. Thus, the fixed lens barrel 220A that includes the movable lens group 235 is configured as a variable focus lens that can be controlled for zooming and focusing.

By configuring the projector 10 in the way described heretofore, when the luminescent plate 101 is rotated and blue light and red light are emitted, respectively, from the excitation light shining device 70 and light of the red wavelength range, light of the green wavelength range and light of the blue wavelength range are sequentially incident on the collective lens 173 and the light tunnel 175 by way of the light guiding optical system 140 and are then incident on the display device 51 by way of the light source-side optical system 170. Thus, the display device 51, which is the DMD, of the projector 10 displays the red, green and blue lights in a time sharing fashion according to data, whereby a colored image can be projected on to the screen.

Figure 5A:
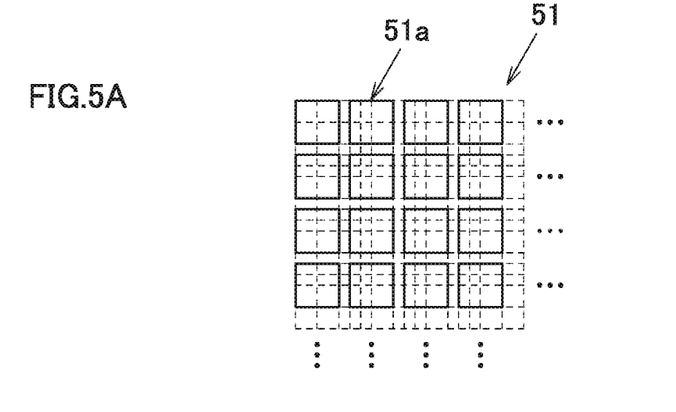
FIG. 5A is an explanatory drawing of a pixel shifting unit that a control module according to the embodiment of the invention controls, illustrating a state in which image light is incident on the image shifting unit from a display device.

Next, the pixel shifting unit 49 controlled by the control module 38 according to the embodiment of the invention will be described by the use of the drawings. Firstly, FIG. 5A illustrates a state in which image light L2 (refer to FIG. 3) is incident on the pixel shifting unit 49 from the display device 51 according to the embodiment of the invention. A plurality of mirrors are provided on the image forming plane of the display device 51, and one of the mirrors is referred to as a mirror 51a. In this case, the plurality of mirrors 51a are formed into rows and columns to form the image forming plane of the display device 51.

Figure 5B:
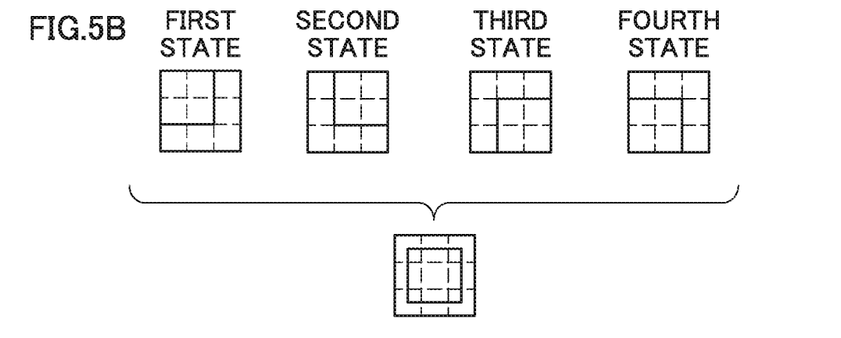
FIG. 5B is an explanatory drawing of the pixel shifting unit that the control module according to the embodiment of the invention controls, illustrating a concept in which four pixel shifted image lights are generated from on one image light by controlling the pixel shifting unit by the control module.

FIG. 5B is an explanatory drawing illustrating a concept in which the control module 38 controls the pixel shifting unit 49 to generate four pixel shifted image lights L3 (refer to FIG. 3) from one image light L2.

Although this will be described later, the pixel shifting unit 49 is controlled by the control module 38 to divide equally one image frame period into four sub-frame periods and shifts a projected image based on image light L2 of each of the plurality of mirrors 51a of the display device 51 for each of the four equally divided sub-frame periods. For example, in the case where a first state of a first sub-frame period is referred to as a reference position, image light L2 in the first state is projected to obtain pixel shifted image light L3. Then, by switching the first sub-frame period to a second sub-frame period, image light L2 is projected in a position (a second state) that deviates ½ of a pixel from the first state, which constitutes the reference position, in a horizontal direction towards the right in FIG. 5B to obtain a pixel shifted image light L3.

Additionally, by switching from the second sub-frame period to a third sub-frame period, image light L2 is projected in a position (a third state) that deviates ½ of a pixel from the second state in a perpendicularly downward direction in FIG. 5B to obtain a pixel shifted image light L3. Then, by switching from the third sub-frame period to a fourth sub-frame period, image light L2 is projected in a position (a fourth state) that deviates ½ of a pixel from the third state in a horizontal direction towards the left in FIG. 5B to obtain pixel shifted image light L3.

Further, by shifting the fourth sub-frame period to the first sub-frame period, image light L2 is projected in a position (the first state) that deviates ½ of a pixel from the fourth state in a perpendicularly upward direction in FIG. 5B to obtain pixel shifted image light L3.

Figure 5C:
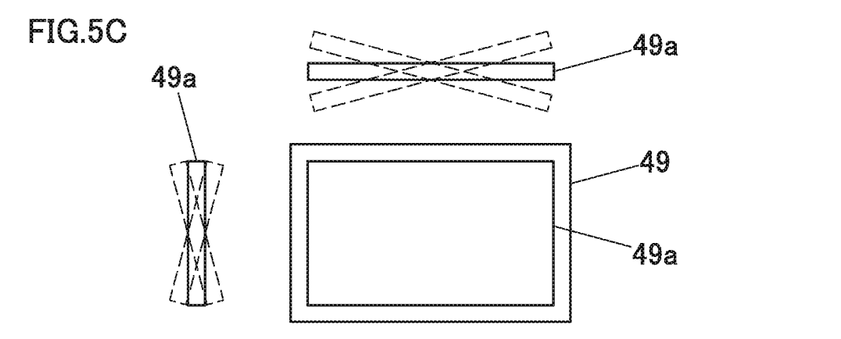
FIG. 5C is an explanatory drawing of the pixel shifting unit that the control module according to the embodiment of the invention controls, illustrating a state in which a glass plate rested on the pixel shifting unit shifts as a result of the pixel shifting unit executing pixel shifting.

FIG. 5C is an explanatory drawing illustrating a state in which a sheet of glass 49a rested on the pixel shifting unit 49 shifts when the pixel shifting unit 49 according to the embodiment of the invention executes the pixel shifting during the first to fourth sub-frame periods.

The (parallel and flat) sheet of glass 49a, which is formed of a parallel and flat glass sheet, is rested on the pixel shifting unit 49, and the pixel shifting unit 49 shifts a pixel by making use of a refracting action of light in the glass 49a. Pixel shifting is executed by inclining an optical axis of the glass 49a relative to a perpendicular plane to translate an optical path of light emitted by the refracting action. The pixel shifting unit 49 controls the inclination of the optical axis of the glass 49a in relation to two rotational axes, whereby the pixel shifting unit 49 can shift a pixel in two horizontal and perpendicular directions.

Figure 5D:
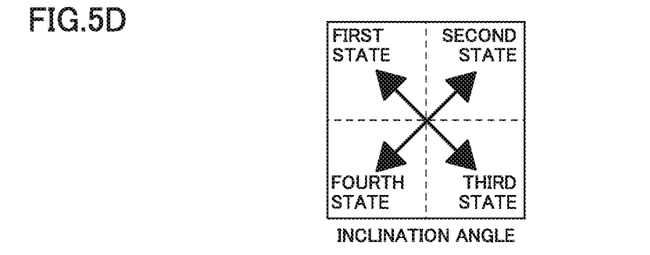
FIG. 5D is an explanatory drawing of the pixel shifting unit that the control module according to the embodiment of the invention controls, illustrating inclination angles and states of the glass plate.

Specifically speaking, initially, the glass 49a is held in a neutral state in which the glass 49a is almost perpendicular relative to an axis of image light L2. Then, as FIG. 5D illustrates, the glass 49a is inclined at an inclination angle θ to be in the first state. Next, the glass 49a is inclined at the inclination angle θ to be in the second state. Following this, the glass 49*a* is inclined at the inclination angle θ to be in the third state. Then, the glass 49*a* is inclined at the inclination angle θ to be in the fourth state. The glass 49*a* is disposed on an optical axis between the display device 51 and the projection lens unit (the projection-side optical system) 220. In addition, by driving an actuator, the glass 49*a* is inclined in a plurality of predetermined directions relative to the optical axis to change an emerging position of image light relative to an incident position thereof. Specifically speaking, the control module drives and controls the actuator that inclines the glass 49*a* in the predetermined directions relative to the optical axis to change the emerging position of image light relative to the incident position thereof for each of the sub-frame periods.

By driving and controlling the actuator in the way described above, the control module 38 controls the pixel shifting unit 49 to generate the pixel shifted images of the four states corresponding to the first to fourth sub-frame periods in the one image frame. The control module 38 forms one pixel on the basis of overlapping image areas before and after the displacement of each pixel. As this occurs, an area of a pixel shifted image generated is divided horizontally and perpendicularly into two pixels×two pixels that correspond to one pixel of a resolution of the display device. The control module 38 can extract a pixel corresponding to a display position within each of the divided areas to generate one piece of high-resolution image whose resolution is four times higher than a resolution of a projected image.

Namely, the actuator is driven and controlled by the control module to incline the glass 49*a* a plurality of times to thereby change the emerging position of light relative to the incident position thereof, whereby the pixel is shifted sequentially and the image data obtained from the plurality of times of inclination of the glass 49*a* is combined together to generate combined image data of one screen, thereby making it possible to obtain a high-resolution image.

Here, since the pixel shifting unit 49 executes the pixel shifting on the pixel during each of the first to fourth sub-frame periods, a predetermined transition time is required until projected light L4 is stabilized, that is, the sheet of glass 49*a* rested on the pixel shifting unit 49 is stabilized within each of the sub-frame periods. In other words, since the glass 49*a* of the pixel shifting unit 49 is not stabilized within the transition time, the transition time constitutes a nullified state (or a nullified period) that is unsuitable for use as projected light L4.

The projector 10 emits light of the red wavelength range, light of the green wavelength range and light of the blue wavelength range from the light source unit 60, and there may be a case where a nullified period where no light source light is emitted or a period where the colors are mixed (hereinafter, referred to as a color mixing period).

Then, the control module 38 according to the embodiment of the invention is designed to synchronize a timing at which the pixel shifting unit 49 displaces each pixel with a timing at which the light source control circuit 41 switches over light beams to be emitted.

Figure 6:
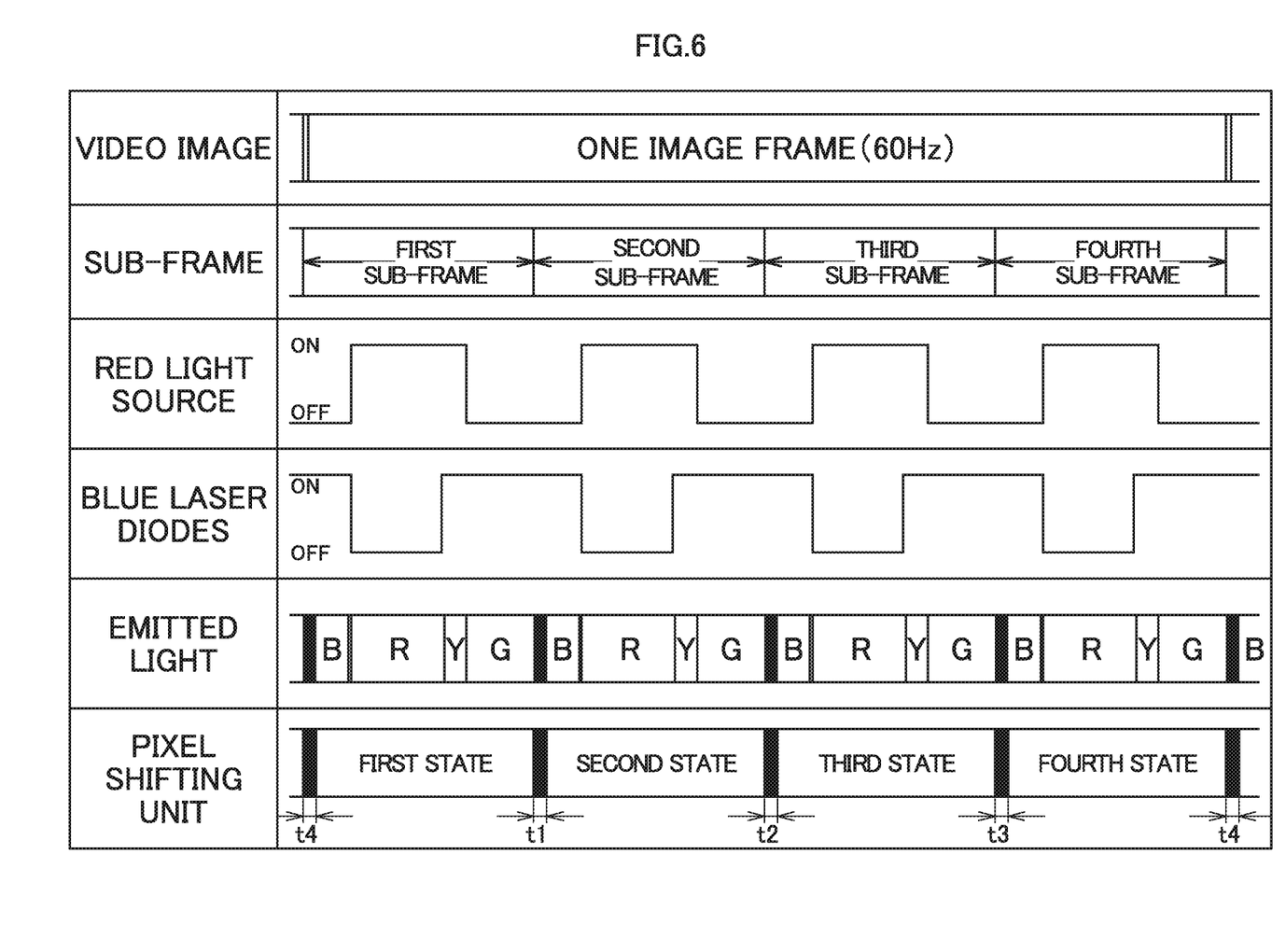
FIG. 6 is a timing chart in which the control module according to the embodiment of the invention synchronizes a timing at which the pixel shifting unit displaces each pixel with a timing at which a light source control circuit switches over emitted light, causing the pixel shifting unit to displace each pixel at a timing at which a green segment emitted from a light source unit is turned off and is then switched to a blue segment.

FIG. 6 is a timing chart illustrating a state in which the control module 38 causes the pixel shifting unit 49 to displace each pixel from the current state (the first state) to the next state (the second state) at a timing at which the control module 30 synchronizes the timing at which the pixel shifting unit 49 displaces each pixel with the timing at which the light source control circuit 41 switches over light beams to be emitted.

FIG. 6 illustrates light beams emitted from the light source unit 60 from the first sub-frame period to the fourth sub-frame period. Since almost similar contents to that of the first sub-frame period are repeated from the second sub-frame period to the fourth sub-frame period, in the following description, the content of the first sub-frame period will be described as the content of each of the sub-frame periods. In the case where a frequency of one image frame is referred to as 60 Hz, a frequency of the sub-frame period is 240 Hz, which is four times larger than the frequency of the one image frame.

The control module 38 rotates the luminescent plate 101 and causes the excitation light shining device 70 and the red light source device 120 to emit corresponding light at different timings. Then, the light source unit 60 emits light of the red wavelength range, light of the green wavelength range and light of the blue wavelength range as FIG. 6 illustrates. A red segment (R) is such that light of the red wavelength range is emitted from the light source unit 60 when the red light source device 120 is on in each sub-frame period.

On the other hand, a green segment (G) is such that excited luminous light of the green wavelength range is emitted from the light source unit 60 when the luminous light emitting area 103 of the luminescent plate 101 receives excitation light which is light of the blue wavelength range emitted from the blue laser diodes 71 in each sub-frame period. A blue segment (B) is such that light emitted from the blue laser diodes 71 is transmitted through the diffuse transmission area 104 of the luminescent plate 101 while being diffused in each sub-frame period. The emitted light that is transmitted through the diffuse transmission area 104 while being diffused is emitted from the light source unit 60 as light of the blue wavelength range of the light source unit 60.

In contrast with the red, green and blue segments, a yellow segment (Y) is such that light of a yellow wavelength range is emitted from the light source unit 60 as a result of light of the red wavelength range (R) and light of the green wavelength range (G) being emitted at the same time in each sub-frame period.

Here, a spoke period is generated at a field period switching timing that is a time period when the emission of red, green and blue light is switched over in one frame. In this spoke period, light illuminated previously remains as an afterimage and the color of the remaining light is mixed with the color of light emitted in the adjoining field period, whereby light of a mixed color is shone. A rising time of the light source which is a time spent from when the light source is started to emit light until the luminous intensity of light emitted from the light source reaches predetermined brightness corresponds to the spoke period.

An accurate colored image corresponding to the color of light to be emitted cannot be projected within the spoke period, that is, a period corresponding to a certain angular period resulting before and after a switching of light to be emitted, and therefore, light of a mixed color emitted within the spoke period is discarded by switching off the micromirror device or is used as light to enhance the brightness of an image by switching on the micromirror device. Since shining spot diameters are the same, the spoke period is generated in any one of periods between B and R fields, R and Y fields, Y and G fields and G and B fields in the emitted light illustrated in FIG. 6. However, a spoke period situated between the G and B fields is a period where the position of the shining spot is physically changed from the luminous light emitting area 103 to the diffuse transmission area 104 and is not a period where the red light source device 121, which is the separate light source from the excitation light source, is caused to emit red light and an optical path of the emitted light from the red light source 121 does not pass through the luminescent plate 101 as in the period between the B and R fields and the period between the R and Y fields, and therefore, the period between the G and B fields becomes the longest when compared with the other periods.

Thus, the control module synchronizes transition times t1 to t4 that are timings at which the pixel shifting unit 49 displaces each pixel (timings at which the pixel shifting unit 49 shifts the display position for each of the sub-frame periods) with the spoke period situated between the G and B fields (the longest timing in the spoke periods) in the timings at which light emitted from the light source portion is switched. The longest timing in the spoke periods is an area situated between the transmission area where light of the first wavelength range is passed through and the luminescent material area where light of the second wavelength range is reflected. The control module 38 may cause the light source control circuit 41 to turn off the blue laser diodes 71 of the light source unit 60 in synchronism with a timing at which the pixel shifting unit 49 sifts from the first state (the current state) of the first sub-frame period to the state (the following state) of the second sub-frame period.

In this way, the control module 38 causes the light source control circuit 41 to switch over light to be emitted to turn off the blue laser diodes 71 of the light source unit 60 in synchronism with the timing at which the pixel shifting unit 49 displaces each pixel, thereby making it possible to improve the quality of a projected image. As this occurs, since the control module 38 can not only start the spoke period (the turning off period) of the light source unit 60 but also cause the pixel shifting unit 40 to execute the pixel shifting, the control module 38 can enable the transition time t1 of the pixel shifting unit 49 to be included in the spoke period (the turning off period). Namely, similarly, also in the sub-frame periods, the control module 38 can enable the transition times t1, t2, t3, t4 of the pixel shifting unit 49 to be included in the spoke periods (the turning off periods).

A projection method of the projector 10 according to the embodiment of the invention includes a first step of forming image light by shining light emitted from the light source unit 60 on to the display device 51, a second step of displacing the current state of each pixel forming the image light in a predetermined direction by the pixel shifting unit 49, a third step of switching over emitted light that the light source unit 60 emits by the light source control circuit 41, and a fourth step of displacing the current state of each pixel forming the image light that is displaced in the predetermined direction to the next state by the pixel shifting unit 49.

By adopting this configuration, with the projection method of the projector 10, after the image light is formed, the current state of each pixel is displaced to the next state, and at the same time, emitted light that the light source unit 60 emits can be switched over. Thus, even though the pixel shifting is executed which requires the predetermined transition time during which image light in the next state is formed, projected light can be stabilized early, and the quality and contrast of an image to be projected can be improved.

MODIFIED EXAMPLES

Additionally, in the projector 10 according to the embodiment of the invention, the light source unit 60 includes the plurality of light source devices configured to emit light of the different wavelength ranges. By adopting this configuration, the control module 38 may have a color mixing period during which two or more light source devices in the plurality of light source devices are illuminated at a timing the light source control circuit 41 switches over emitted light that the light source unit 60 emits.

Figure 7:
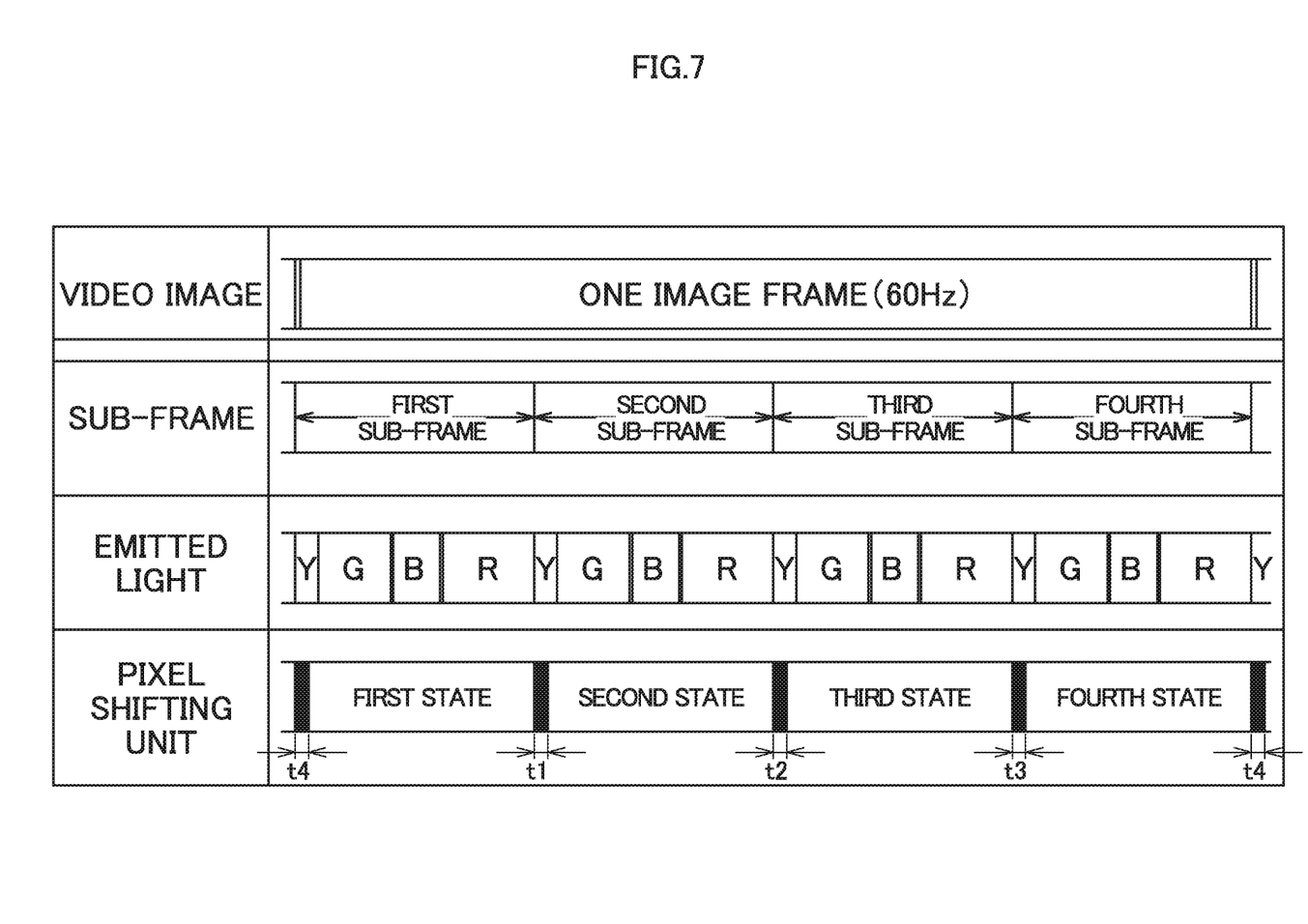
FIG. 7 illustrates transition times of the pixel shifting unit according to the embodiment of the invention and a timing chart in one image frame of emitted light of the light source unit, illustrating a state in which the pixel shifting unit 49 is caused to execute pixel shifting during a color mixing period in which light of a yellow wavelength range is emitted.

FIG. 7 illustrates transition times of the pixel shifting unit 49 according to the embodiment of the invention and a timing chart in one image frame of emitted light of the light source unit 60. In this embodiment, the light source unit 60 includes the excitation light shining device 70 and the red light source device 120.

In a modified example, the pixel shifting unit 49 is designed to execute pixel shifting at a timing at which light of a yellow wavelength range (Y), which is light of a mixed color of light of the green wavelength range and light of the red wavelength range, is emitted. Specifically speaking, light of the yellow wavelength range (Y) is emitted from the light source unit 60 by emitting light of the red wavelength range (R) from the red light source device 120 and emitting light of the green wavelength range (G) from the luminous light emitting area 103. As this occurs, the control module 38 can cause the pixel shifting unit 49 to execute pixel shifting during the color mixing period during which light of the yellow wavelength range (Y) is being emitted.

By adopting this configuration, being different from the case where monochromatic light made up of light of the red wavelength range (R), light of the green wavelength range (G) or light of the blue wavelength range (B) is emitted, even though image light or projected light is blurred, this affects little a high-resolution image to be generated and can make the unevenness or roughness of the high-resolution image inconspicuous.

The control module 38 may set so that light of a cyan wavelength range (C), which is light of a mixed color, is emitted from the light source unit 60 as emitted light by modifying the configuration of the luminescent plate 101. As this occurs, when light of the red wavelength range (R) is emitted during the color mixing period during which light of the cyan wavelength range (C), which is light of a mixed color, is emitted, emitted light that the light source unit 60 emits is turned into light of a white wavelength range (W).

This enables the pixel shifting unit 40 to execute pixel shifting during which light of the white wavelength range (W) is being emitted, whereby the unevenness or roughness of a high-resolution image can be made more inconspicuous.

The control module 38 may set a predetermined color mixing period during which light of a corresponding mixed color is emitted from the light source unit 60 and set a duty for the color mixing period. For example, let's assume that one frame of a colored image to be projected is made up of four fields in total, that is, an R field, a G field, a Y field and a B field. As this occurs, the control module 38 can set a color mixing period for light of the yellow wavelength range (Y) in such a manner that transition times in first to fourth sub-frame periods coincide with the color mixing period during which light of the yellow wavelength range (Y) is emitted. The color mixing period is not limited to the period during which light of the yellow wavelength range (Y) is emitted. Hence, the color mixing period may be a period between the G field and the B field during which light of the cyan wavelength range (C) is emitted or a period between the B field and the R field during which light of a magenta wavelength range (M) is emitted.

Thus, as has been described heretofore, the projector 10 of the invention includes the light source unit 60, the light source control circuit 41 configured to control the light source unit 60, the display device 51 on to which emitted light L1 is shone from the light source unit 60 to generate image light L2, the pixel shifting unit 49 configured to displace the current state of each pixel forming the image light L2 in the predetermined direction to generate image light L2 in the next state, the projection lens unit 220 on to which the image light L2 is shone and which emits projected light L4, and the control module 38 configured to control the light source control circuit 41 and the pixel shifting unit 49. The control module 38 synchronizes the timing at which the pixel shifting unit 49 displaces each pixel with the timing at which the light source control circuit 41 switches over emitted light that the light source unit 60 emits.

By adopting this configuration, with the projector 10, even though the pixel shifting requiring the predetermined transition period is executed, the projected light forming the high-resolution image can be stabilized early, thereby making it possible to improve the quality and contrast of the image.

The control module 38 may turn off the light source unit 60 at a timing at which the light source control circuit 41 switches over emitted light that the light source unit 60 emits. As this occurs, the control module 38 can cause the light source unit 60 to start the spoke period (the turning off period) and the pixel shifting unit 49 to execute the pixel shifting, and therefore, each transition time, for example, the transition time t1 of the pixel shifting unit 49 can be included in the spoke period (the turning off period).

Further, the control module 38 does not have to set separately a predetermined transition time for the pixel shifting unit 49, whereby a manhour for the user to set the predetermined transition time can be omitted.

The light source unit 60 includes the plurality of light source devices configured to emit light of the different wavelength ranges, and the control module 38 may have a color mixing period during which two or more light source devices in the plurality of light source devices are illuminated at a timing at which the light source control circuit 41 switches off emitted light that the light source unit 60 emits.

By adopting this configuration, being different from the case where monochromatic light made up of light of the red wavelength range (R), light of the green wavelength range (G) or light of the blue wavelength range (B) is emitted, even though image light or projected light is blurred, this affects little a high-resolution image to be generated and can make the unevenness or roughness of the high-resolution image inconspicuous.

The current state and the next state can each be the first state, the second state, the third state and the fourth state. Since the current state and the next state correspond to the four states of the first state to the fourth state in the first to fourth sub-frame periods of one image frame, one image frame can be formed.

The control module 38 may form one pixel on the basis of the overlapping pixel areas before and after the displacement of each pixel.

By adopting this configuration, since the control module 38 can obtain pixel shifted image light L3 based on the four states corresponding to the first to fourth sub-frame periods, the control module 38 can generate a high-resolution image whose resolution is four times higher than that of projected light.

The light source unit 60 may include further the projection lens unit (the projection-side optical system) 220 on which image light L2 is incident and which emits projected light L4.

By adopting this configuration, the projector 10 can project image light L2 as projected light L4.

The projection method of the projector 10 of the invention includes the first step of forming image light by shining emitted light from the light source unit 60 on to the display device 51, the second step of displacing the current state of each pixel forming image light in the predetermined direction by the pixel shifting unit 49, the third step of switching over emitted light that the light source unit 60 emits by the light source control circuit 41, and the fourth step of displacing the current state of each pixel forming the image light that is displaced in the predetermined direction to the next state by the pixel shifting unit 49.

By adopting this configuration, with the projection method of the projector 10, after the image light is formed, the current state of each pixel is displaced to the next state, and at the same time, emitted light that the light source unit 60 emits can be switched over. Thus, even though the pixel shifting is executed which requires the predetermined transition time during which image light in the next state is formed, projected light can be stabilized early, and the quality and contrast of an image to be projected can be improved.

In the embodiment, although the pixel shifting unit 49 is described as executing the pixel shifting by making use of the refracting action of the (parallel and flat sheet of) glass 49a that is made of the parallel and flat sheet of glass, the invention is not limited to this configuration. For example, a configuration may be adopted in which a movable unit to which the display device 51 is fixed is provided as the pixel shifting unit 49 and the control module controls the position of the display device 51 by moving the movable unit.

While the embodiment of the invention has been described heretofore, the embodiment is presented as an example, and hence, there is no intention to limit the scope of the invention by the embodiment. This novel embodiment can be carried out in other various forms, and various omissions, replacements and modifications can be made to the embodiment without departing from the spirit and scope of the invention. Those resulting embodiments and their modifications are included in the spirit and scope of the invention and are also included in the scope of inventions claimed for patent under claims below and their equivalents.

What is claimed is:

1. A projector comprising:
   a light source unit having:
      a first light source configured to emit light of a first wavelength range;
      a luminescent wheel on which a transmission area configured to transmit the light of the first wavelength range and a luminescent material area on to which the light of the first wavelength range is shone and which is configured to be excited thereby to emit (reflect) light of a second wavelength range that differs from the light of the first wavelength range are provided sequentially in a circumferential direction; and
      a third light source configured to emit light of a third wavelength range different from light of the first wavelength range and light of the second wavelength range;
   a display device on to which emitted light from the light source unit is shone to form image light;
   a parallel and flat glass sheet that makes use of a refracting action of light and shifts a display position of the image light for each sub-frame period of a plurality of sub-frame periods making up one image frame period; and a processor configured to control the light source unit and the parallel and flat glass sheet,
wherein the processor synchronizes a timing at which the parallel and flat glass sheet shifts the display position for each of the plurality of sub-frame periods with a timing of emission of light of a fourth wavelength range which is a color mixture of light of the second wavelength range and light of the third wavelength range.

2. The projector according to claim 1,
wherein the parallel and flat glass sheet is disposed on an optical path between the display device and a projection lens unit with stacked lenses, and the parallel and flat glass sheet has an actuator is configured to change an emerging position relative to an incident position of image light by inclining the parallel and flat glass sheet in a plurality of predetermined directions relative to an optical axis of the parallel and flat glass sheet, and
wherein the processor drives and controls the actuator configured to change the emerging position relative to the incident position of the image light by inclining the parallel and flat glass sheet in one of the plurality of predetermined directions relative to the optical axis of the parallel and flat glass sheet for each of the plurality of sub-frame periods.

3. The projector according to claim 1,
wherein the processor turns off the light source unit at a same time that the light of the first wavelength range and light of the second wavelength range are switched over as the emitted light.

4. The projector according to claim 1,
wherein display positions of the image light to be shifted are a first state, a second state, a third state and a fourth state.

5. The projector according to claim 1,
wherein the processor forms one pixel on the basis of overlapping image areas before and after a shift of each pixel where a display device of the image light is shifted.

6. The projector according to claim 1, comprising further:
a projection lens unit with stacked lenses on which the image light is incident and which is configured to emit projected light.

7. A projection method for a projector comprising:
a light source unit having:
　a first light source configured to emit light of a first wavelength range; and
　a luminescent wheel on which a transmission area configured to transmit the light of the first wavelength range and a luminescent material area on to which the light of the first wavelength range is shone and which is configured to be excited thereby to emit (reflect) light of a second wavelength range that differs from the light of the first wavelength range are provided sequentially in a circumferential direction; and
a third light source configured to emit light of a third wavelength range different from light of the first wavelength range and light of the second wavelength range;
a display device on to which emitted light from the light source unit is shone to form image light;
a parallel and flat glass sheet that makes use of a refracting action of light and shifts a display position of the image light for each sub-frame period of a plurality of sub-frame periods making up one image frame period; and
a processor configured to control the light source unit and the parallel and flat glass sheet, the projection method comprising:
synchronizing a timing at which the parallel and flat glass sheet shifts the display position for each of the plurality of sub-frame periods with a timing of emission of light of a fourth wavelength range which is a color mixture of light of the second wavelength range and light of the third wavelength range.

* * * * *